United States Patent
Lackritz et al.

(10) Patent No.: US 11,989,660 B1
(45) Date of Patent: May 21, 2024

(54) TRANSACTION ENTITY PREDICTION WITH A GLOBAL LIST

(71) Applicant: Intuit, Inc., Mountain View, CA (US)

(72) Inventors: Hadar Lackritz, Tel-Aviv (IL); Natalie Bar Eliyahu, Azor (IL); Omer Wosner, Naale (IL); Sigalit Bechler, Bney Zion (IL)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/209,439

(22) Filed: Jun. 13, 2023

(51) Int. Cl.
*G06F 40/174* (2020.01)
*G06N 5/022* (2023.01)
*G06N 20/00* (2019.01)

(52) U.S. Cl.
CPC ............. *G06N 5/022* (2013.01); *G06N 20/00* (2019.01); *G06F 40/174* (2020.01)

(58) Field of Classification Search
None
See application file for complete search history.

(56) References Cited

U.S. PATENT DOCUMENTS

| | | | | |
|---|---|---|---|---|
| 2020/0311161 A1* | 10/2020 | Messenger | ......... | G06F 16/9536 |
| 2021/0097491 A1* | 4/2021 | Minyard | ................ | G06N 20/00 |
| 2022/0028502 A1* | 1/2022 | Hake | ....................... | G06F 16/93 |
| 2023/0065915 A1* | 3/2023 | Berestovsky | ........ | G06V 30/414 |
| 2023/0139614 A1* | 5/2023 | Risuleo | ................. | G06F 40/284 |
| | | | | 715/224 |
| 2023/0153650 A1* | 5/2023 | Mossoba | ................ | G06N 20/10 |
| | | | | 706/12 |

OTHER PUBLICATIONS

Zhang, et al., "A Bayesian Graph Embedding Model for Link-Based Classification Problems" IEEE Transactions on Network Science and Engineering, vol. 9, No. 2, Mar./Apr. 2022, pp. 716-727. (Year: 2022).*

* cited by examiner

*Primary Examiner* — Amelia L Tapp
(74) *Attorney, Agent, or Firm* — Dinsmore & Shohl, LLP

(57) ABSTRACT

Certain aspects of the disclosure pertain to predicting a candidate entity match for a transaction with a machine learning model. A description of a transaction associated with an organization is received as input. In response, at least one machine learning model can be invoked to infer a transaction embedding based on the description, a first score that captures similarity between the transaction embedding entity embeddings associated with a global list of entities and organizations, a second score that captures a probability of interaction between the first organization and the entities based on organization and entity embeddings that capture profile data associated with the organization and the entities, and at least one candidate entity based on the first score and the second score. Finally, the inferred candidate entity can be output for use by an automated data entry or other process or system.

20 Claims, 9 Drawing Sheets

TRANSACTION ENTITY PREDICTION WITH A GLOBAL LIST

BACKGROUND

Field

Aspects of the subject disclosure relate to machine-learning-based entity prediction.

Description of Related Art

Automated data entry (e.g., automatic field filling or completion) is a feature of software applications that aims to improve user experience by reducing the time and effort required to input data. This feature suggests or automatically fills in the content of a field and is particularly useful in scenarios where the input data is repetitive or standardized, such as online forms or database management systems, and can significantly improve productivity and efficiency. The effectiveness of automated data entry depends on the ability to identify the correct content to enter automatically. Conventionally, text string matching and similarity techniques have been employed to identify content to automatically enter. Consider a situation in which a field corresponds to a vendor associated with a bank transaction. If a text string in bank transaction data is an exact match or is substantially similar to a vendor name, then the vendor name can be the content utilized for automated data entry. However, if there is no match, default content, no content, or an error message may be presented in the field, which is not helpful to a user. Accordingly, there is a need in the art for improved content identification for at least automated data entry.

SUMMARY

According to one aspect, a method includes receiving a description of a transaction associated with a first organization and invoking at least one machine learning model. The at least one machine learning model can be configured to infer a transaction embedding based on the description, a first score that captures similarity between the transaction embedding entity embeddings associated with a global list of entities and organizations, a second score that captures a probability of interaction between the first organization and the entities based on organization and entity embeddings that capture profile data associated with the organization and the entities, and at least one candidate entity based on the first score and the second score. Further, the method includes returning the at least one candidate entity.

Other aspects provide processing systems configured to perform the aforementioned method as well as those described herein; non-transitory, computer-readable media comprising instructions that, when executed by a processor of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects of this disclosure.

DESCRIPTION OF THE DRAWINGS

The appended figures depict certain aspects and are, therefore, not to be considered limiting of the scope of this disclosure.

To facilitate understanding, identical reference numerals have been used, where possible, to designate identical elements common to the drawings. It is contemplated that elements and features of one embodiment may be beneficially incorporated in other embodiments without further recitation.

DETAILED DESCRIPTION

Figure 1:
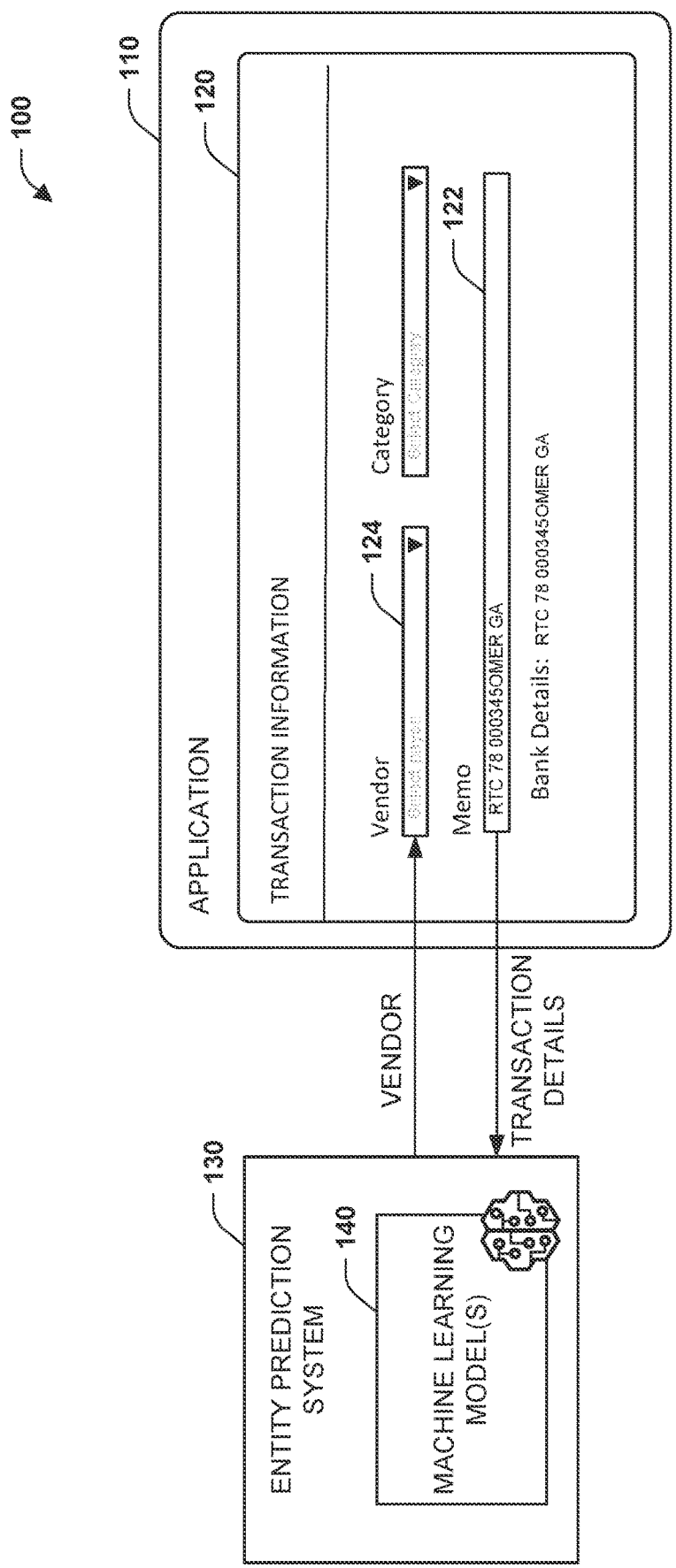
FIG. 1 is a block diagram of a high-level overview of an example implementation of transaction entity prediction and automated data entry.

Aspects of the subject disclosure provide apparatuses, methods, processing systems, and computer-readable mediums for predicting a transaction entity based on a global list of entities, learned embeddings, and similarity computations. Predicting entities for transactions improves automated data entry into an application's fields, saving time and reducing errors, among other things. Traditionally, determining an entity for a transaction relied on text string matching techniques. However, such techniques are highly sensitive to transaction data including exact or near word matches. For example, a matching entity for a transaction will not be found if the transaction data does not include an exact or very similar entity name. Such information is regularly omitted or distorted (e.g., truncated) in transactions based on the underlying systems handling the transaction and reporting its data. Generally, because each underlying system may provide transaction information in a different format, traditional matching techniques are ineffective across heterogeneous transaction data.

Thus, a technical problem exists concerning performant identification of an entity associated with a transaction—especially where transaction information is not standardized. This underlying technical problem creates related technical problems, such as with software-based automated data entry (e.g., automatic field filling or completion). Aspects described herein provide a technical solution to the aforementioned technical problem, which involves training a machine learning model to identify an entity based on contextual information associated with a transaction, and not mere word matching as in conventional techniques. Furthermore, a global list of entities associated with various organizations can be utilized as a basis for entity prediction to increase coverage of a machine learning model and thus improve the capability of the model to make predictions over diverse inputs.

However, increasing the coverage of a machine learning model can introduce a further technical problem of reducing model accuracy as a source of possible entities becomes larger and more comprehensive since the model considers a much denser space. Aspects described herein provide a further technical solution to the aforementioned technical problem by training one or more machine learning models to consider an organization profile and entity profile to predict the probability that the organization (e.g., company, business) and entity (e.g., vendor, supplier, provider, wholesaler) will interact. Utilizing textual context and interaction data over a global list of entities provides a beneficial technical effect of reducing the number of entities for evaluation to those that are relevant, which can improve prediction accuracy and processing speed. Improvements in prediction accuracy and processing speed enable a corresponding improvement in automated data entry.

In some aspects, embeddings are generated for organizations, entities, and transactions, which may correspond to supply chain participants, roles, or actions in one embodiment. An organization can correspond to a company, business, or other enterprise that offers products or services for sale, for example, to customers or others that use or consume the products or services. An entity can be a vendor or supplier that provides products or services to organizations. A transaction can correspond to a purchase or other interaction between an organization and an entity. Embeddings comprise numerical values in a multidimensional space that capture context data such as features, attributes, or characteristics of, for example, an organization, entity, or transaction. Comparisons of embeddings, such as the entity and transaction embeddings and the entity and organization embeddings, enable predicting an entity that matches the transaction with an organization, which may be used for automated data entry in various aspects.

Beneficially, capturing context information with embeddings produced by trained machine learning models results in improved matching performance between entities and transactions. Moreover, in aspects described herein, a global list of entities associated with multiple organizations can be preprocessed to reduce computational complexity, improving matching speed, precision, and other beneficial technical effects. For example, multiple levels of deduplication remove duplicates often introduced through a lack of consistency in manual specification.

Accordingly, aspects described herein provide many beneficial technical effects compared to conventional matching techniques and provide a technical solution to the aforementioned technical problems in the art.

Example Implementation of Transaction Entity Prediction and Automated Data Entry FIG. 1 depicts a high-level overview of an example implementation 100 of aspects associated with improved transaction entity prediction enabling a corresponding improvement in automated data entry. The implementation includes an application 110 and transaction information window 120.

The application 110 can be a financial transaction management application in some embodiments, such as a digital accounting application or other collection of financial transactions. For example, the application 110 can include a chart of accounts that lists accounts a business uses to record financial transactions, such as income and expenses. In this instance, the chart of accounts can provide a framework for maintaining accurate financial records. In accordance with one embodiment, the application 110 can be communicatively coupled to a financial institution in a manner that permits access to transaction data maintained by the institution.

The transaction information window 120 is a graphical interface mechanism that renders transaction information for review. Per one embodiment, the transaction information can include bank details in a memo field 122. In some applications, such as accounting applications, a vendor is required for a transaction to be considered complete and compliant for tax and auditing purposes. The vendor field 124 accepts user input manually specifying the entity. According to certain aspects, vendor field 124 can correspond to a drop-down menu listing of previously specified vendors as manual selection options.

Entity prediction system 130 is configured to interact with the transaction information window 120 within the application 110. More specifically, the entity prediction system 130 can receive a transaction description, including, for example, bank details specified in memo field 122. The entity prediction system 130 can invoke one or more machine learning models 140 to process the transaction description in order to predict an entity that matches the transaction description. A machine learning model 140 can generate a representation of the transaction description (e.g., a transaction vector representation) that captures meaning and context. Utilizing that same machine learning model, a different machine learning model, or another process, the transaction representation can be compared to entity representations (e.g., entity vector representations) from a global list of entities associated with organizations or, in one embodiment, vendors for various businesses. A similarity score may be generated by comparing the transaction representation to each vendor representation. Further, a comparison can be made between an organization utilizing the application 110 and entities in a global entity list to predict the likelihood of interaction; in other words, the likelihood of the organization transacting with the entity. The results of these comparisons can be utilized as a basis for predicting a candidate vendor that matches the transaction description. The entity prediction system 130 can transmit the candidate vendor to the transaction information window 120, for instance, by way of an application programming interface (API), for automated data entry in the vendor field 124 or to otherwise suggest or recommend the candidate vendor. For example, the candidate vendor can be presented outside the vendor field 124 or as a tooltip upon hovering over the vendor field 124. In another scenario, the candidate vendor can be highlighted in a drop-down menu list of vendors for selection or otherwise indicated to a user as the predicted matching vendor.

In accordance with certain aspects, the machine learning model 140 can correspond to an embedding machine learning model 140 that generates embeddings for vendors and transactions. In one embodiment, a single machine learning model can be employed that produces embeddings, computes similarity scores, and selects a vendor to output, among other things. In another embodiment, multiple machine learning models can be employed. For example, a first machine learning model 140 can generate embeddings, and a second machine learning model can predict a vendor for a transaction based on the embeddings. In some cases, a vendor may only be identified when confidence in the prediction is greater than a threshold, when similarity between the vendor embedding and the transaction embedding meets a threshold, or the like. In other words, where a matching vendor is predicted by a machine learning model 140 with low confidence, the predicted matching vendor may not be provided to a user or application, such as financial management application 110.

A transaction description or data can, in one example, include bank details presented in memo field 122. As shown in the example of FIG. 1, the bank details are "RETCH 78 0003450MER GA." Here, the bank details are coded and do not explicitly specify an entity name. Thus, a text-string matching approach seeking to match each of the sequences "RTC," "78," "0003450MER," and "GA" to the entity "RaceTrac" is likely to either fail or misidentify a vendor. However, utilizing context information following "RTC," a trained machine learning model 140 can identify the entity as "RaceTrac," a gas station and convenience store. For example, the prediction can be based on embeddings that capture features, attributes, or properties (e.g., location) associated with the transaction and potential matching vendors. Context information such as the location (e.g., GA) and store number (e.g., 78) can be captured in embeddings and utilized as a basis to compute similarity. After the vendor is predicted, the predicted vendor can be suggested for data entry completion for vendor field 124, as discussed above.

Example System for Entity Prediction

Figure 2:
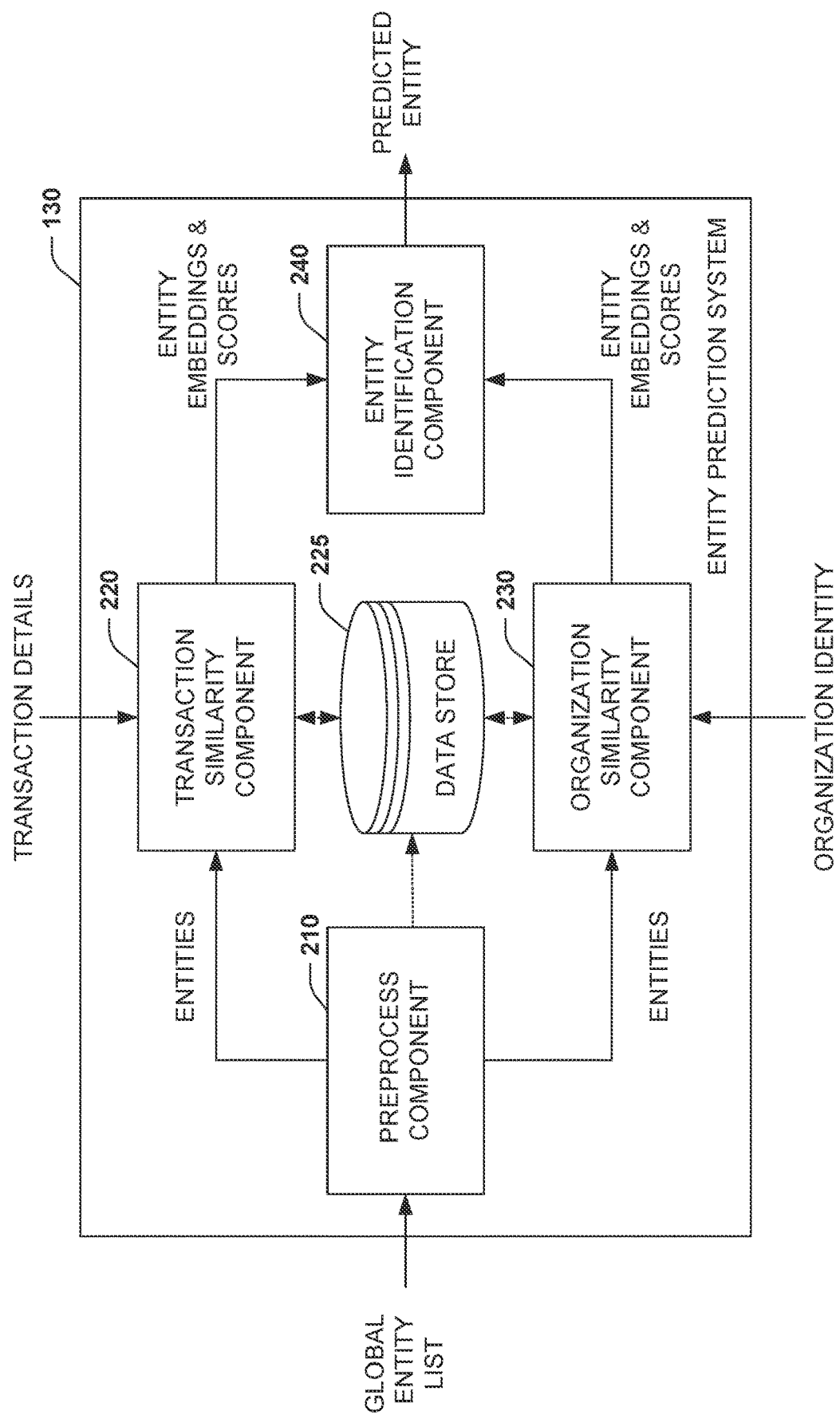
FIG. 2 is a block diagram of an example entity prediction system.

FIG. 2 illustrates a block diagram of an example implementation of the entity prediction system 130 briefly described in FIG. 1. In the depicted example, the entity prediction system 130 includes preprocess component 210, transaction similarity component 220, organization similarity component 230, and entity identification component 240. The preprocess component 210, transaction similarity component 220, organization similarity component 230, and entity identification component 240 can be implemented by at least one processor (e.g., processor 902 of FIG. 9) coupled to at least one memory (e.g., computer-readable medium 912 of FIG. 9) that stores instructions that cause the at least one processor to perform the functionality of each component when executed. Furthermore, all or a portion of the functionality of each component can be performed alone or in conjunction with one or more machine learning models 140. Consequently, a computing device can be configured to be a special-purpose device or appliance that implements the functionality of the entity prediction system 130. Further, all or portions of the entity prediction system 130 can be distributed across computing devices or made accessible through a network service.

The preprocess component 210 is configured to perform data manipulation operations to ensure or enhance performance. By way of example, and not limitation, the preprocess component 210 can receive a global entity list comprising entities associated with different organizations and perform preprocessing of the data, such as data cleansing and reduction, among other things. In certain embodiments, the data reduction can correspond to deduplication, which produces a new representation of the global entity list that is a subset of the original list. Manual data entry creates a challenge since an entity can be written in different ways including with aliases. For example, an entity can be specified by a brand or subsidiary (e.g., Air Jordan®, Converse®) associated with an entity rather than the entity itself (e.g., Nike®). The preprocess component 210 can deduplicate such manually specified entities. Deduplication is generally a technique used to eliminate redundant copies of data, which reduces the amount of storage required and improves overall efficiency. Moreover, deduplication enables high model coverage (e.g., the extent to which a machine learning model can produce accurate predictions for various inputs or scenarios), resulting from increased data matching options with increased precision. The transaction similarity component 220 and the organization similarity component 230 can operate over deduplicated data produced by the preprocess component 210. Data can be provided in a deduplicated format in an alternate embodiment, so the preprocess component 210 can omit or bypass such processing. After the global entity list or other data is preprocessed, the processed list can be stored for subsequent use to save processing time. Furthermore, after embeddings are generated for entities, the embeddings can replace or be stored in addition to raw text for expeditious retrieval and processing. In one instance, entity embeddings can be saved to the data store 225. Further example details regarding the preprocess component 210 are provided later herein with respect to FIG. 3.

The transaction similarity component 220 is configured to predict (e.g., by way of machine learning model inference or output) the similarity of a transaction to a particular entity in the global entity list. The transaction similarity component 220 can employ a machine learning model to generate a transaction embedding based on transaction data. The transaction similarity component 220 can also generate entity embeddings, or retrieve previously generated entity embeddings from a data store 225, a repository for persistently storing and retrieving embeddings. Similarity can be computed between the transaction and entities from their respective embeddings. For example, cosine similarity can be computed, which measures the angle between two vectors projected in a multidimensional space, namely the transaction embedding and the entity embedding in the current example. In accordance with one embodiment, a top number of entities (e.g., common, popular, or frequently used) can be output based on similarity score. Further, the number of entities considered can be limited to a top number of global entities to reduce and expedite processing. The transaction similarity component 220 output can be entity embeddings (or a subset thereof) and corresponding scores.

The organization similarity component 230 is configured to receive an organization identity and entity candidates. An organization can correspond to a user or user group of an application, such as a financial management application. The organizations can be associated with an identity, such as a name or other identifier. The organization similarity component 230 can generate an organization embedding based on historical interaction with entities. The organization similarity component 230 can also generate entity embeddings based on historical interaction with organizations or other entities or retrieve previously generated and saved embeddings from the data store 225. The organization similarity component 230 can predict how likely the organization and each entity are to interact based on similarity, which measures how related or close an organization and entity are to each other. In certain embodiments, distance functions can generate a similarity score, such as cosine or Euclidian distance functions, among others, wherein small di stances indicate similarity and large di stances denote dissimilarity. The organization similarity component 230 can output entity embeddings (or a subset thereof) and corresponding scores.

The entity identification component 240 receives, retrieves, or otherwise obtains or acquires input from the output of the transaction similarity component 220 and the organization similarity component 230. The transaction similarity component 220 provides data regarding entity embeddings from the global entity list that are similar to transaction data in the form of a first similarity score associated with each transaction and entity pair. The organization similarity component 230 provides data regarding entity embeddings that are similar to the organization in the form of a second similarity score for each organization and entity pair. In other words, the organization similarity component 230 identifies entities with which an organization is likely to interact. The entity identification component 240 can correspond to or utilize a trained machine learning model 140 that utilizes the first and second similarity scores to identify one or more predicted entities to output for a transaction. According to one embodiment, an entity with the greatest similarity scores concerning the transaction and organization can be output. In accordance with another embodiment, the machine learning model can seek to classify entities as matching or not matching and output one or more matching entities as the predicted entity. In other words, the entities similar to a transaction can be further filtered based on entities with which an organization is likely to interact, thereby improving the accuracy of a predicted entity match over a global entity list.

Figure 3:
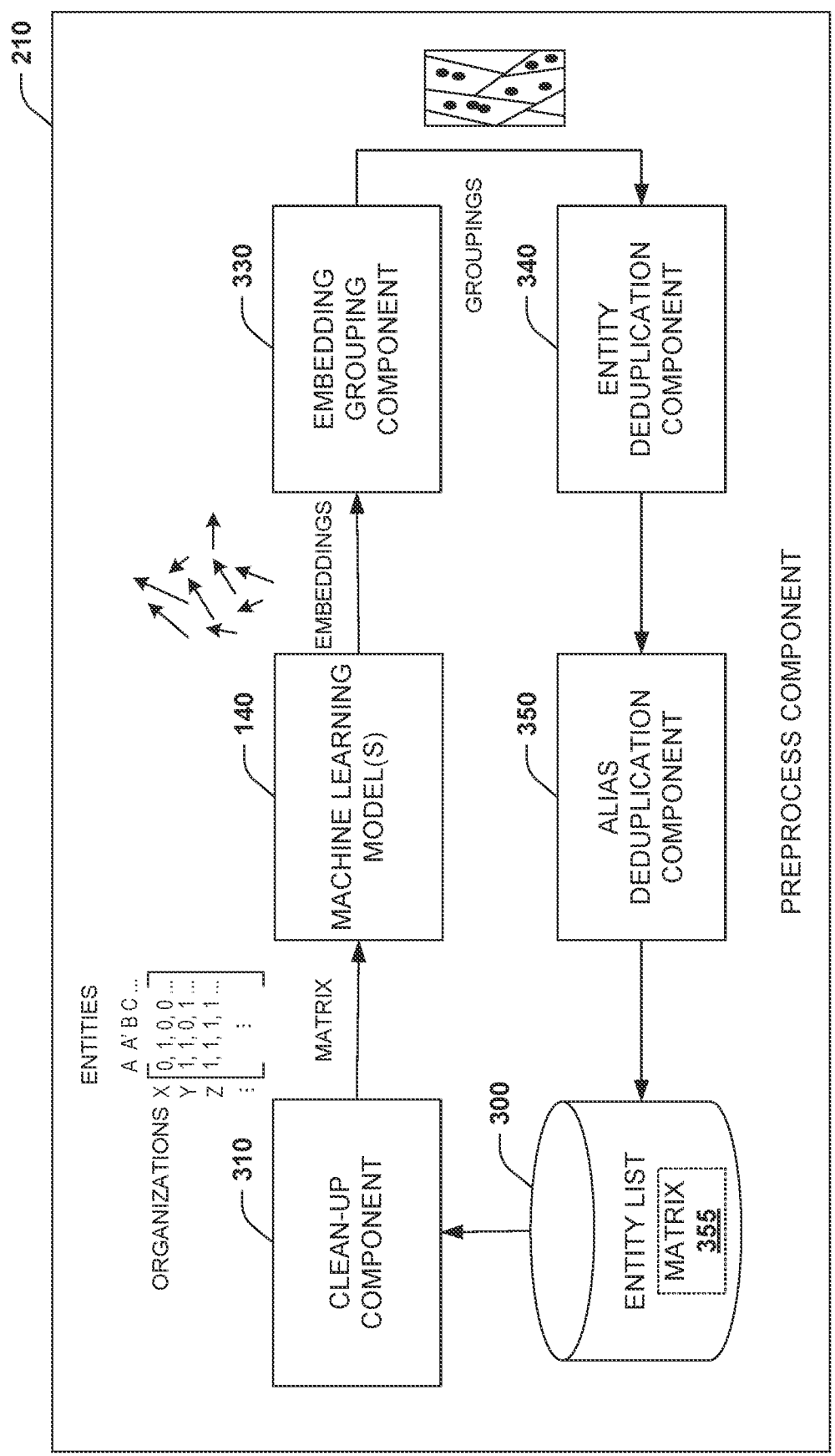
FIG. 3 is a block diagram of an example preprocess component of an entity prediction system.

Turning attention to FIG. 3, an example preprocess component 210 is illustrated in further sample detail. Recall that the preprocess component 210 is configured to deduplicate entities in a global list of entities associated with multiple organizations. More specifically, the preprocess component 210 can receive an initial version of a global list of entities and produce (e.g., generate or transform) another global list comprising a subset of the initial version and embeddings for subsequent processing (e.g., similarity operations, predictions). The preprocess component 210 includes an entity list 300, clean-up component 310, one or more machine learning models 140, embedding grouping component 330, entity deduplication component 340, alias deduplication component 350, and matrix 355.

The clean-up component 310 is configured to clean data added by organization users. Users can manually specify entities introducing human error and inconsistency. The clean-up component 310 analyzes and cleans the data to make the data more consistent. For example, the clean-up component 310 can flatten lower/upper case letters (e.g., convert all letters to uppercase or lowercase) and correct spelling errors. Further, the clean-up component 310 can perform naïve deduplication by consolidating known aliases. In other words, different variations of the same entity can be identified and merged into a single standard representation. For example, an entity can be entered in various ways, such as "Race Trac," "Race-Trac," and "RaceTrac," among others. These variations can be consolidated or merged into a standardized representation, such as "Race-Trac" After completing the aforementioned processes, the clean-up component 310 can generate a matrix with rows of organizations (e.g., X, Y, Z . . . ) and columns of entities (e.g., A, A', B, C . . . ) to facilitate further processing. In accordance with one embodiment, the top "x" or some multiple of "x" number of entities can be included.

The machine learning model(s) 140 can process the output of component 310, which can be a matrix. Further, the machine learning model(s) 140 can generate entity embeddings. For example, the machine learning model 140 can correspond to a collaborative filter that creates an abstract lower-level dimensional vector representation per organization and entity. Matrix factorization, neural collaborative filtering, or field-aware matrix factorization can also be performed to include more features on the organization and entities, such as size, address, and average sales amounts received by an entity, among other things.

The embedding grouping component 330 is configured to segment embeddings to determine which are alike and which are not. In one embodiment, a clustering technique, such as an approximate nearest neighbor algorithm, can be employed to split the space into "K" groups and repeat the split several times to avoid converging to a solution based on a single random split.

The entity deduplication component 340 is configured to remove an entity embedding that satisfies a threshold distance from another embedding. In accordance with one embodiment, a number of dense grouping segments can be identified from the output of the embedding grouping component 330. Density can refer to the number of embeddings in a grouping segment. Dense grouping segments can refer to segments with a number of embeddings that satisfies a threshold or relative density with respect to the number of embeddings of all grouping segments. For instance, the ninety-fifth percentile of the densest segments can be selected. In other words, from a distribution of densities associated with all groups, the groups with densities greater than ninety-five percent in the distribution can be selected as the densest segments. Next, the distance between entities in these segments can be computed to aid in determining whether entities are the same. If the text similarity of two entity names (e.g., Hamming distance, Levenshtein distance) satisfies a threshold designated as high and the entity embeddings are within a threshold close distance (e.g., Euclidean distance, cosine, dot product), the entity can be deemed the same entity and removed.

The alias deduplication component 350 is configured to provide an additional layer of deduplication of entities based on aliases beyond naïve deduplication performed by the clean-up component 310. The alias deduplication component can receive entity-deduplicated groupings from the entity deduplication component 340. A number of dense grouping segments can be identified by receiving such information from the entity deduplication component 340 or determining the dense grouping segments utilizing techniques similar to the entity deduplication component 340. The most common entity in each group can be identified. Next, the alias deduplication component 350 can initiate a web search or crawl to locate and create a list of aliases for the entity. For instance, the search can be specified to identify an entity's brands. For example, a shoe company can market products under its own brand and other brands, including subsidiary brands, which may be used in different regions, markets, countries, etc. The alias deduplication component 350 can utilize the alias list to identify and remove aliases from a group segment. The process can continue to deduplicate aliases found in other dense segments. The result of this and other deduplication functions is the matrix 355 comprising deduplicated entities and corresponding organizations that interacted with the deduplicated entities, which can be subject to further processing by the transaction similarity component 220 and organization similarity component 230 of FIG. 2.

Figure 4:
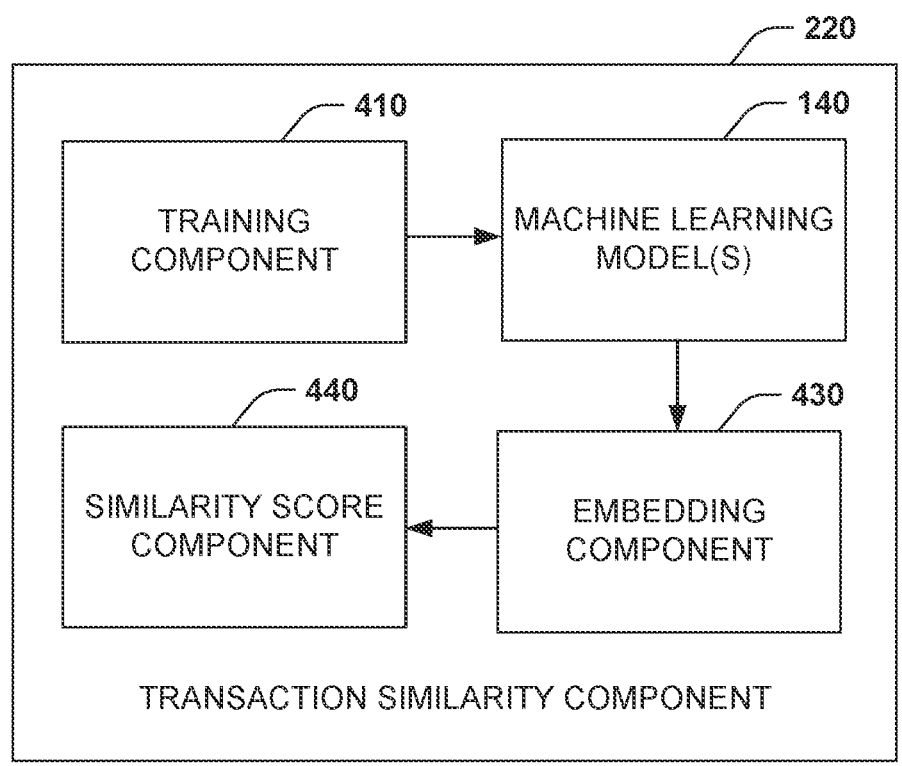
FIG. 4 is a block diagram of an example transaction similarity component of an entity prediction system.

FIG. 4 depicts an example transaction similarity component 220 in further detail. The transaction similarity component 220 includes training component 410, machine learning model(s) 140, embedding component 430, and similarity score component 440, all of which can be implemented by at least one processor (e.g., processor 902 of FIG. 9) coupled to at least one memory (e.g., computer-readable medium 912 of FIG. 9) that stores instructions that cause the at least one processor to perform the functionality of each component when executed.

The training component 410 is configured to train one or more machine learning models 140. The training component 410 can train a machine learning model 140 with historical user feedback data regarding entity identification. For example, users may manually associate entities with transactions that become labeled data for supervised learning. In accordance with one aspect, the training component 410 can train an embedding machine learning model with historical user response data that produces embeddings for entities and transactions. An embedding can capture the meaning and context of an object it represents.

One or more machine learning models 140 can be produced with training data and processing by the training component 410. One machine learning model can provide aggregate functionality associated with predicting an entity. In an alternate embodiment, generation of embeddings and predicting a matching entity can be split across machine learning models. In one embodiment, a machine learning model can be generated from scratch without relying on any previous model. In another embodiment, a pre-trained machine learning model, such as a natural language processing (NLP) model, can be trained, fine-tuned, or updated for entity identification.

The embedding component 430 is configured to produce and store embeddings for entities, for example, in data store 225 of FIG. 2. In certain aspects, an organization, such as a company, can be associated with a set of entities or vendors based on previous interactions. For each entity in an entity list associated with an organization, the embedding component 430 can invoke (e.g., trigger execution) the machine learning model 140 to produce the respective embedding and save the embedding to a data store 225. The embedding component 430 enables entity embeddings to be predetermined to optimize processing and response time and enable real-time or near-real-time entity identification in a production environment. In an alternative embodiment, the entity embeddings could be determined when a call is made to predict an entity, but by preprocessing the entities and storing them locally or remotely, they can be quickly accessed, and overall speed is improved. Further, using a high-speed database for these embeddings can further improve response time to predicting and outputting an entity to a user. Furthermore, per one embodiment, previously generated embeddings can be retrieved from a storage location rather than generating the embeddings again. For example, the embedding can be computed in conjunction with preprocessing and utilized again for a different purpose.

The similarity score component 440 is configured to determine similarity between a transaction and one or more entities. The similarity score component 440 can compute similarity scores for each transaction and entity pair (e.g., each entity in a global list). One or more similarity scores associated with one or more entities can be output for subsequent consideration in combination with similarity scores for each organization and entity pair. To reduce computations, the similarity score component 440 can operate over a subset of entities in a global list, such as a number of top entities, including, for example, entities associated with many organizations (e.g., well-known or popular).

Figure 5:
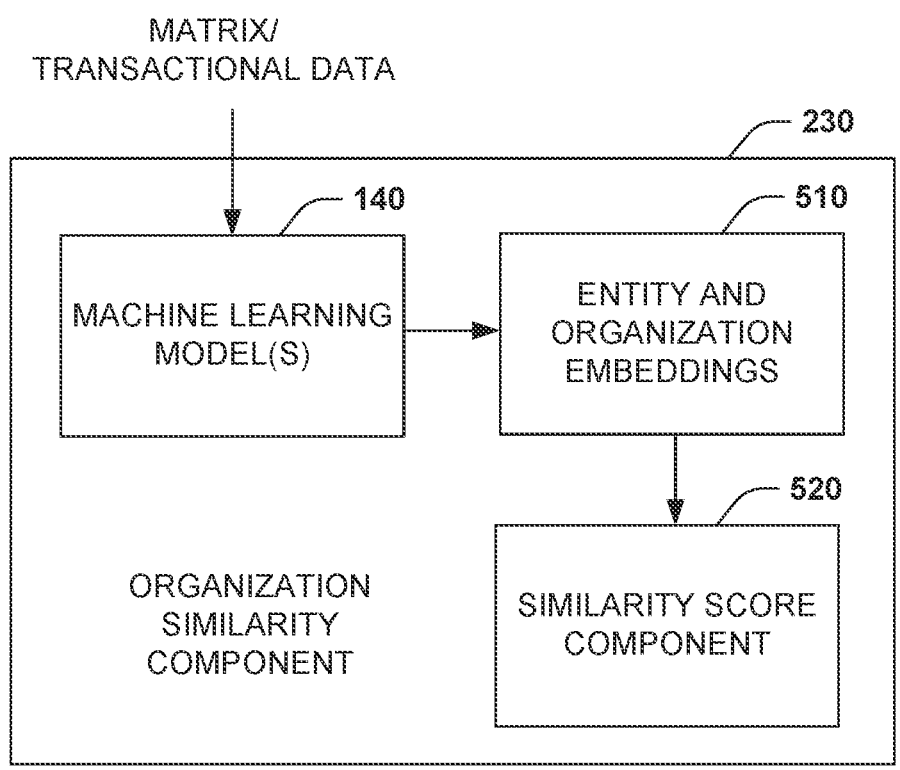
FIG. 5 is a block diagram of an example organization similarity component of an entity prediction system.

Turning attention to FIG. 5, an example organization similarity component 230 is illustrated in further detail. The organization similarity component 230 includes machine learning model (s) 140, entity and organization embeddings 510, and similarity score component 520, all of which can be implemented by at least one processor (e.g., processor 902 of FIG. 9) coupled to at least one memory (e.g., computer-readable medium 912 of FIG. 9) that stores instructions that cause the processor to perform the functionality of each component when executed.

The machine learning model(s) 140 corresponds to one or more models trained with historical interaction data concerning entity identification. The machine learning model can receive or retrieve one of two types of input data, namely a matrix or transactional data. In accordance with one embodiment, processing functionality can return a deduplicated matrix of entities associated with organizations. The machine learning model(s) 140 can generate embeddings for entities specified in the matrix. Alternatively, one or more pre-generated embeddings can be retrieved from the data store 225 of FIG. 2, for instance, using a name of an entity as a key to a row that includes the embedding. For example, preprocessing performed by the preprocess component 210 of FIG. 2 and FIG. 3 can generate such embeddings. Additionally, the machine learning model can utilize the matrix to aid generation of an organization embedding. For example, the organization can be looked up in the matrix to identify one or more entities with which the organization interacts.

However, a problem exists when an organization does not have data regarding use of entities in the global list, such as when an organization is new and does not have any interaction data yet, which can be referred to as a semi-cold start problem. This problem is solved by acquiring and utilizing transaction data to generate an organization embedding by the machine learning model(s) 140. According to one embodiment, an automatic encoder and decoder framework can generate an embedding from the most common and informative (defined by term frequency and inverse document frequency (TF-IDF)) services or items in invoices and bills, for example.

After the entity and organization embeddings 510 are generated, retrieved, or both, similarity can be determined for organization and entity pairs. More specifically, the similarity score component 520 can compare an organization embedding to an entity embedding and generate a score representing the similarity of the two embeddings. Here, the similarity can also predict the likelihood that a corresponding organization and entity will interact. Scores can be generated for all or a subset of entities in a global list of entities. These organization similarity scores can be output for use with transaction similarity scores to predict one or more entities associated with a transaction.

Note that the entity prediction system 130 can utilize machine learning model(s) 140 to at least one of generate embeddings, determine similarity, or infer an entity that corresponds to a transaction. In accordance with one embodiment, the entity prediction system 130 can implement a meta model, which corresponds to a high-level model that operates on other base models rather than original input data. For example, a high-level machine learning model that predicts an entity that matches a transaction can also include base machine learning models to generate embeddings, deduplicate entities, determine similarity between transaction data and entities, and determine similarity between an organization and entities associated with other organizations. Further, in the preceding description, the machine learning model(s) 140 are depicted within components and subcomponents. In one embodiment, the machine learning model(s) 140 can be different components. In another embodiment, the machine learning model(s) 140 can be a shared component or service that other components can invoke.

Example Methods of Entity Prediction

Figure 6:
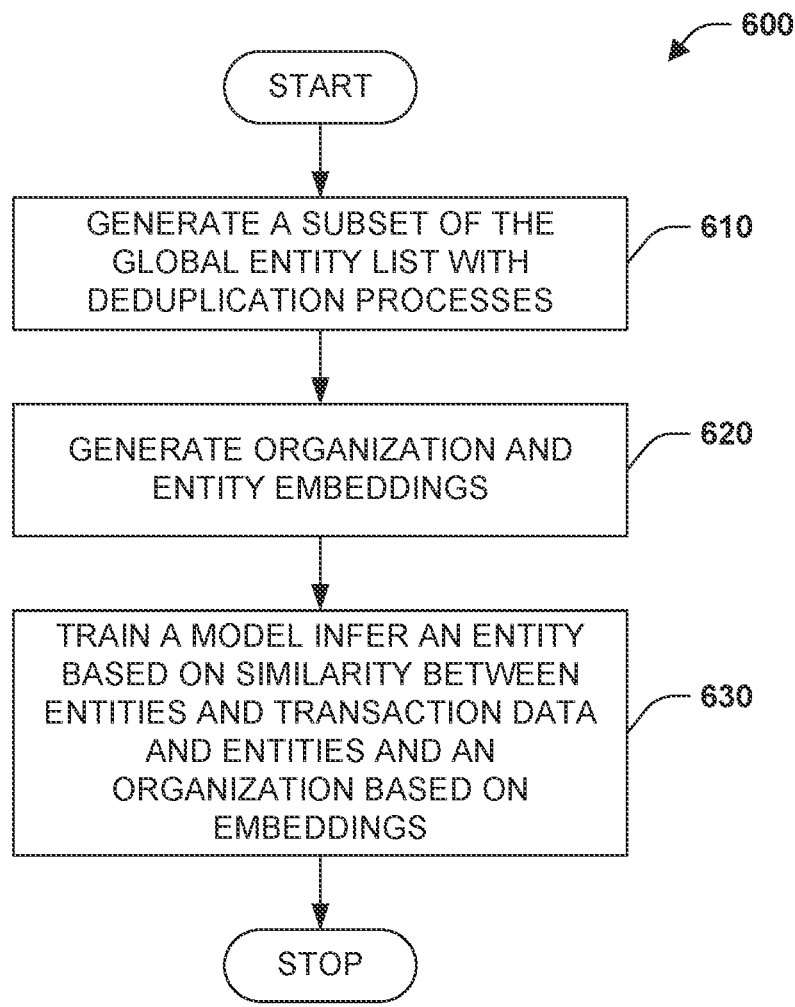
FIG. 6 is a flow chart diagram of an example method of phased entity prediction.

FIG. 6 depicts an example method 600 of training a machine learning model to predict an entity associated with a transaction. In one aspect, method 600 can be implemented by entity prediction system 130 (of FIG. 1) to produce a model such as machine learning model 140 (of FIG. 1).

Method 600 starts at block 610 with generating a subset of a global entity list with one or more deduplication processes. Given a global entity list comprising a number of entities associated with multiple organizations, the method can generate a new global entity list by deduplicating entries in an initial set of entities, which can result from variations in an entity's manual specification. A clean-up process can be performed that flattens lower/upper case letters, corrects spelling errors, and performs naïve deduplication to consolidate known aliases. Other deduplication processes can remove entities deemed the same based on a determined distance (or difference) between each other as well as by searching for aliases for entities and removing entity aliases.

Method 600 then proceeds to block 620 with generating organization and entity embeddings. A machine learning model can be employed to generate the embeddings. Organization embeddings can capture context regarding historical interactions with entities, among other things. In one embodiment, transaction data of a company can be utilized as a basis for the embedding absent entity interactions associated with the organization. Entity embeddings can capture characteristics of an entity in the context of an entity to transaction mapping and organization interaction.

Method 600 continues next to block 630 with training a machine learning model to predict a matching entity for a transaction. In accordance with one embodiment, the machine learning model can be trained to predict the entity based on similarity between entities and transaction data and entities and an organization profile based on embeddings. The trained machine learning model can subsequently be saved and invoked (e.g., initiate execution) on input transaction data, for example, associated with automated data entry.

Note that FIG. 6 is just one example of a method, and other methods including fewer, additional, or alternative steps are possible consistent with this disclosure.

Figure 7:
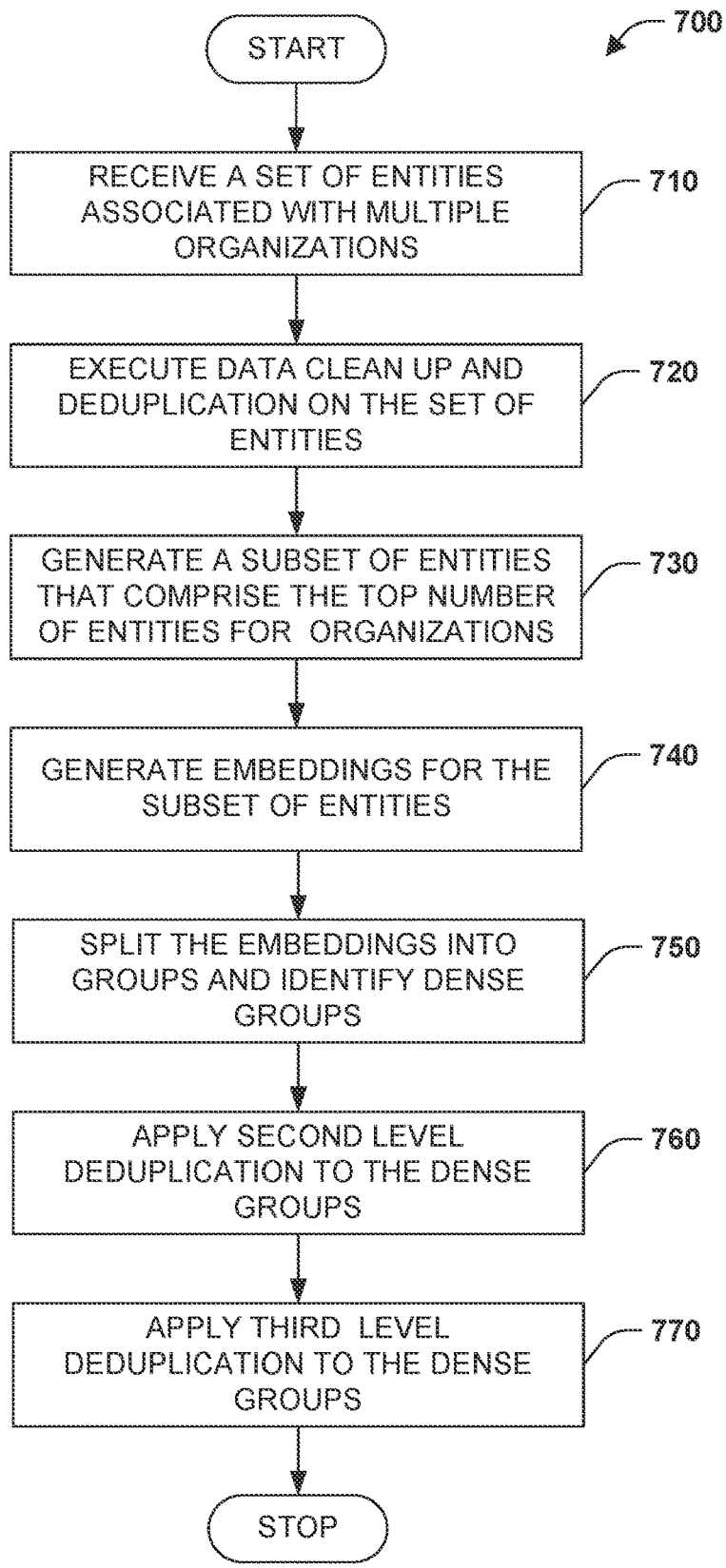
FIG. 7 is a flow chart diagram of an example method of global list preprocessing.

FIG. 7 illustrates an example method 700 of preprocessing a global list of entities. The method 700 can be implemented by the entity prediction system 130, including preprocess component 210 (of FIG. 2) and preprocessing logic 914 (of FIG. 9)

The method 700 begins at block 710 with receiving a set of entities associated with multiple organizations. This set of entities can be received in response to a request from a data store to provide a global list of entities. This list can identify organizations and one or more entities with which the organizations have interacted.

The method 700 then proceeds to block 720 with executing data clean-up on the set of entities. The data clean-up can include flattening lower/upper case letters and correcting spelling errors, followed by first-level naïve deduplication that consolidates known aliases.

The method 700 continues to block 730 with generating a subset of entities that comprises a top number of entities (e.g., top 5× of entities that have several variations) for organizations. In accordance with one embodiment, a subset of data can be operated on rather than the entire set to reduce computations and increase processing speed. Here, techniques such as term frequency and inverse document frequency can be utilized to determine a configurable number of common/popular entities from particular organizations (e.g., large companies, niche businesses).

The method 700 next proceeds to block 740 with generating embeddings for the subset of entities. A trained machine-learning model can be invoked to generate these embeddings. The embeddings can comprise numerical values in a multidimensional space that capture context data such as features, attributes, or characteristics of an entity and may represent characteristics of an entity in the context of an entity to transaction mapping.

The method 700 continues to block 750 with splitting generated embeddings into groups and identifying one or more dense groups comprising a multitude of embeddings. According to one embodiment, an approximate nearest neighbor technique can be employed to split an entity space into groups. The number of entities in each group can be counted to determine a range of group densities.

The method 700 next proceeds to block 760 with applying a second-level deduplication to the dense groups. In one embodiment, text distance between entities in dense groups can be calculated. If the text similarity is high and the representation of entities based on past interaction (e.g., embedding) is high, the same entity is likely represented, and deduplication can be executed to remove redundant entities.

Before terminating, the method 700 next moves to block 770 with applying a third-level deduplication to the dense groups. In one embodiment, the most common entity in each group is identified. A web search or crawl is triggered with the name of the entity to identify and create a list of aliases. Aliases found in each group are then deduplicated to remove redundant entities.

Note that FIG. 7 is just one example of a method, and other methods including fewer, additional, or alternative steps are possible consistent with this disclosure.

Figure 8:
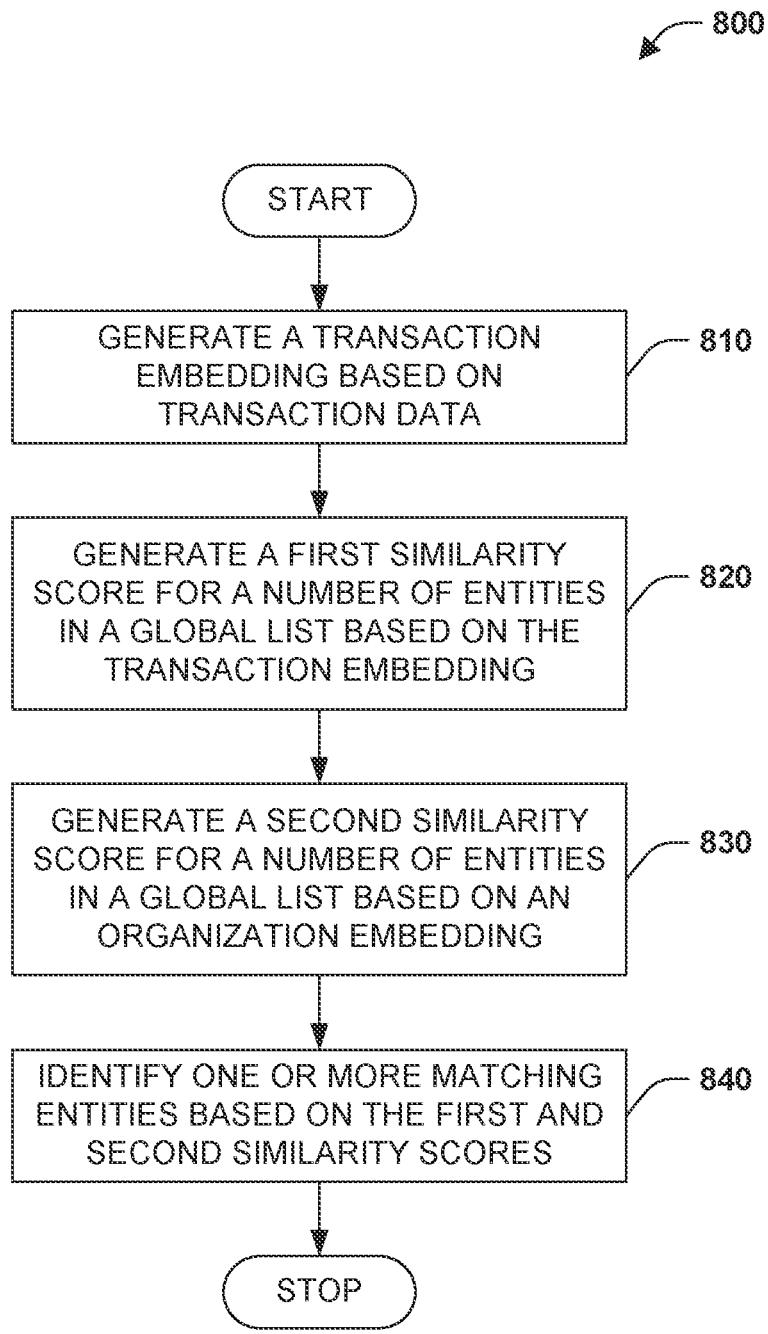
FIG. 8 is a flow chart diagram of an example method of entity prediction.

FIG. 8 illustrates an example method 800 for predicting an entity associated with a transaction. The method 800 can be implemented by the entity prediction system 130 (of FIG. 1 and FIG. 2), including the transaction similarity component 220, organization similarity component 230, and entity identification component 240 (of FIG. 2).

The method 800 begins at block 810 with generating a transaction embedding based on transaction data. Transaction data can be received as input triggering the prediction of a corresponding entity. A trained machine learning model can be employed to generate an embedding capturing context such as features, attributes, or characteristics of the transaction.

The method 800 continues at block 820 with generating a similarity score for a number of entities in a global list based on the transaction embedding. The number of entities can be configurable, and in accordance with one embodiment, entities can be the most common entities to reduce processing time while still having broad coverage of varying types of input. For each entity, a similarity score can be computed between an entity embedding and the transaction embedding.

The method 800 then proceeds at block 830 with generating a similarity score for a number of entities in a global list based on an organization embedding. Similar to block 820, the number of entities can be configurable and, in certain embodiments, correspond to the most common entities. For each entity, a similarity score is computed between the entity embedding and an organization embedding. In this manner, the similarity score represents the probability that an organization will interact with an entity. In accordance with one embodiment, a collaborative filter can be executed to create the organization and entity embeddings from profile data regarding interactions, and the inner product of the organization embedding and an entity embedding can be determined to produce the likelihood that the organization and entity interact.

Prior to terminating, the method 800 continues at block 840 with identifying one or more matching entities based on the first and second similarity scores. For example, a machine learning model can be trained to learn patterns between transaction similarity and organization similarity to predict an entity for a transaction accurately.

Note that FIG. 8 is just one example of a method, and other methods including fewer, additional, or alternative steps are possible consistent with this disclosure.

Example Processing System for Entity Prediction

Figure 9:
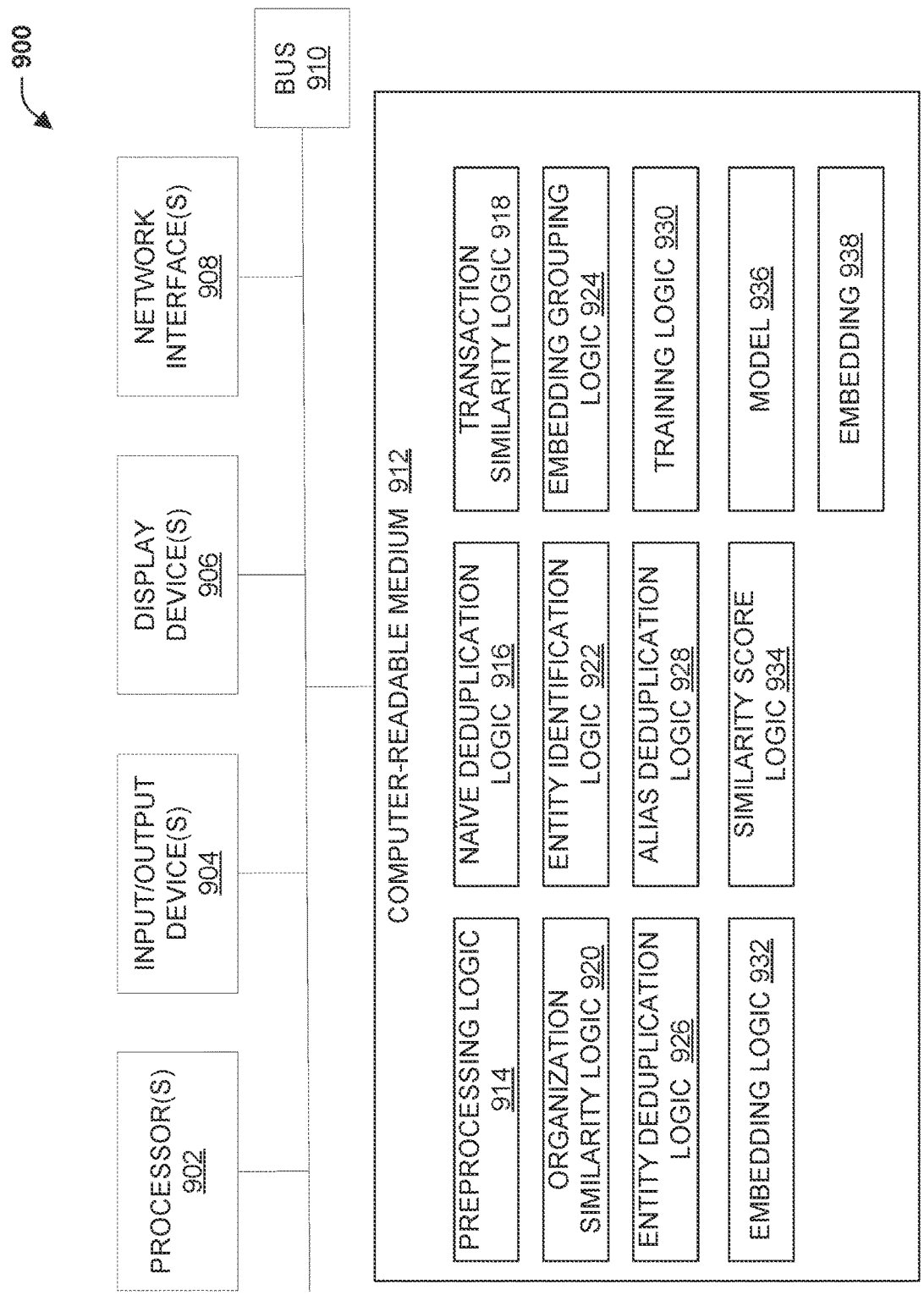
FIG. 9 is a block diagram of an operating environment within which aspects of the subject disclosure can be performed.

FIG. 9 depicts an example processing system 900 configured to perform various aspects described herein, including, for example, methods as described above with respect to FIGS. 6-8.

Processing system 900 is generally an example of an electronic device configured to execute computer-executable instructions, such as those derived from compiled computer code, including without limitation personal computers, tablet computers, servers, smart phones, smart devices, wearable devices, augmented or virtual reality devices, and others.

In the depicted example, processing system 900 includes one or more processors 902, one or more input/output devices 904, one or more display devices 906, and one or more network interfaces 908 through which processing system 900 is connected to one or more networks (e.g., a local network, an intranet, the Internet, or any other group of processing systems communicatively connected to each other), and computer-readable medium 912.

In the depicted example, the aforementioned components are coupled by a bus 910, which may generally be configured for data or power exchange amongst the components. Bus 910 may be representative of multiple buses, while only one is depicted for simplicity.

Processor(s) 902 are generally configured to retrieve and execute instructions stored in one or more memories, including local memories like the computer-readable medium 912, as well as remote memories and data stores. Similarly, processor(s) 902 are configured to retrieve and store application data residing in local memories like the computer-readable medium 912, as well as remote memories and data stores. More generally, bus 910 is configured to transmit programming instructions and application data among the processor(s) 902, display device(s) 906, network interface(s) 908, and computer-readable medium 912. In certain embodiments, processor(s) 902 are included to be representative of one or more central processing units (CPUs), graphics processing units (GPUs), tensor processing units (TPUs), accelerators, and other processing devices.

Input/output device(s) 904 may include any device, mechanism, system, interactive display, or various other hardware components for communicating information between processing system 900 and a user of processing system 900. For example, input/output device(s) 904 may include input hardware, such as a keyboard, touch screen, button, microphone, or other device for receiving inputs from the user. Input/output device(s) 904 may further include display hardware, such as, for example, a monitor, a video card, or other another device for sending or presenting visual data to the user. In certain embodiments, input/output device(s) 904 is or includes a graphical user interface.

Display device(s) 906 may generally include any device configured to display data, information, graphics, user interface elements, and the like to a user. For example, display device(s) 906 may include internal and external displays, such as an internal display of a tablet computer or an external display for a server computer or a projector. Display device(s) 906 may further include displays for devices, such as augmented, virtual, or extended reality devices.

Network interface(s) 908 provide processing system 900 access to external networks and processing systems. Network interface(s) 908 can generally be any device capable of transmitting or receiving data through a wired or wireless network connection. Accordingly, network interface(s) 908 can include a transceiver for sending or receiving wired or wireless communication. For example, Network interface(s) 908 may include an antenna, a modem, a LAN port, a Wi-Fi card, a WiMAX card, cellular communications hardware, near-field communication (NFC) hardware, satellite communication hardware, or any wired or wireless hardware for communicating with other networks or devices/systems. In certain embodiments, network interface(s) 908 includes hardware configured to operate in accordance with the Bluetooth® wireless communication protocol.

Computer-readable medium 912 may be a volatile memory, such as a random access memory (RAM), or a non-volatile memory, such as non-volatile random access memory, phase change random access memory, or the like. In this example, computer-readable medium 912 includes preprocessing logic 914, naïve deduplication logic 916, transaction similarity logic 918, organization similarity logic 928, entity identification logic 920, naïve deduplication logic 922, embedding grouping logic 924, entity deduplication logic 926, alias deduplication logic 928, training logic 930, embedding logic 932, similarity score logic 934, model 936 and embedding 938.

In certain embodiments, preprocessing logic 914 improves data quality from a global list. In certain embodiments, the preprocessing logic 914 can clean the data to flatten capitalized and uncapitalized letters and correct spelling errors, among other things. The preprocess component 212 of FIG. 2 can perform the preprocessing logic.

In certain embodiments, the preprocessing logic 914 can include or trigger execution of naïve deduplication logic 916. The naïve deduplication logic 916 can be performed by the preprocess component 210 of FIG. 2 and the clean-up component 310 of FIG. 3

In certain embodiments, transaction similarity logic 918 compares the similarity of transaction embeddings and entity embedding. The transaction similarity component 220 of FIG. 2 can perform the transaction similarity logic 918.

In certain embodiments, organization similarity logic 920 compares the similarity of organization embeddings and entity embeddings. The organization similarity component 230 of FIG. 2 can perform the organization similarity logic 920.

In certain embodiments, entity identification logic 922 can predict an entity associated with a transaction. The entity identification component 240 of FIG. 2 can perform the entity logic 922.

In certain embodiments, naïve deduplication logic 922 can perform data transformation and straightforward deduplication. The clean-up component 310 of FIG. 3 can perform the naïve deduplication logic 922.

In certain embodiments, embedding grouping logic 924 segments embeddings into separate groups. The embedding grouping logic 924 can be performed by embedding grouping component 330 of FIG. 3.

In certain embodiments, entity deduplication logic 926 deduplicates entities that are close in groupings. The entity deduplication logic 926 can be performed by entity deduplication component 340 of FIG. 3.

In certain embodiments, alias deduplication logic 928 can deduplicate aliases of entities. The alias deduplication logic 928 can be performed by the alias deduplication component 350 of FIG. 3.

In certain embodiments, training logic 930 can train a machine learning model with respect to entity prediction. The training logic 930 can be performed by the training component 410 of FIG. 4.

In certain embodiments, embedding logic 932 can generate embedding for transactions, entities, and organizations. The embedding logic 932 can be performed by embedding component 430 of FIG. 4.

In certain embodiments, similarity score logic 934 can compute similarity between two embeddings. The similarity score logic 934 can be performed by the similarity score component 440 of FIG. 4.

In certain embodiments, the computer-readable medium 912 can include a trained machine learning model 936 and one or more embeddings 938 produced by the machine learning model 140.

Note that FIG. 9 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: receiving a description of a transaction associated with a first organization, invoking at least one machine learning model to infer: a transaction embedding based on the description, a first score that captures similarity between the transaction embedding entity embeddings associated with a global list of entities and organizations, a second score that captures a probability of interaction between the first organization and the entities based on organization and entity embeddings that capture profile data associated with the organization and the entities, and at least one candidate entity based on the first score and the second score and returning the at least one candidate entity.

Clause 2: The method of Clause 1, further comprising creating the global list of entities from manually entered entities and deduplicating the manually entered entities.

Clause 3: The method of Clauses 1-2, wherein creating the global list of entities further comprises generating the entity embeddings for a configurable number of entities.

Clause 4: The method of Clauses 1-3, further comprising grouping the entities based on the entity embeddings.

Clause 5: The method of Clauses 1-4, further comprising determining the density of each group of the entities and identifying one or more groups that satisfy a density threshold.

Clause 6: The method of Clauses 1-5, further comprising computing text distance between entities in the one or more groups and removing one or more entities when the text distance satisfies a deduplication threshold.

Clause 7: The method of Clauses 1-6, further comprising identifying at least one entity alias for an entity in one or more of the groups, adding the at least one entity alias to an alias list, and deduplicating the at least one entity alias.

Clause 8: The method of Clauses 1-7, further comprising executing a collaborative filter to create the organization embedding and the entity embeddings from the profile data and determining an inner product of the organization embedding and an entity embedding to determine a likelihood that the organization and the entity interact.

Clause 9: The method of Clauses 1-8, further comprising generating an organization embedding based on transactional data absent data regarding use of one or more entities.

Clause 10: A processing system, comprising: a memory comprising computer-executable instructions; and a processor configured to execute the computer-executable instructions and cause the processing system to perform a method in accordance with any one of Clauses 1-9.

Clause 11: A processing system, comprising means for performing a method in accordance with any one of Clauses 1-9.

Clause 12: A non-transitory computer-readable medium storing program code for causing a processing system to perform the steps of any one of Clauses 1-9.

Clause 13: A computer program product embodied on a computer-readable storage medium comprising code for performing a method in accordance with any one of Clauses 1-9.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps or actions may be interchanged with one another without departing from the scope of the claims. In other words, unless a specific order of steps or actions is specified, the order or use of specific steps or actions may be modified without departing from the scope of the claims. Further, the various operations of methods described above may be performed by any suitable means capable of performing the corresponding functions. The means may include various hardware or software component(s) or module(s), including, but not limited to a circuit, an application specific integrated circuit (ASIC), or processor. Generally, where operations are illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later become known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims.

What is claimed is:

1. A method of entity predictive matching, comprising:
    receiving a description of a transaction associated with an organization;
    invoking at least one machine learning model to infer:
        a transaction embedding based on the description;
        a first score that captures similarity between the transaction embedding and entity embeddings associated with a global list of entities and organizations, wherein the global list is generated by deduplicating an initial set of entities based on a density of a group of entities that satisfies a density threshold;
        a second score that captures a probability of interaction between the organization and the global list of entities based on an organization embedding and entity embeddings that capture profile data associated with the organization and the entities; and
        at least one candidate entity based on the first score and the second score; and
    returning the at least one candidate entity.

2. The method of claim 1, further comprising generating the global list of entities by deduplicating an initial set of entities based on one or more of spelling or letter case variations.

3. The method of claim 1, further comprising generating the entity embeddings for a configurable number of entities in the global list.

4. The method of claim 1, further comprising segmenting the initial set of entities into one or more groups of entities based on the entity embeddings and similarity between the entity embeddings.

5. The method of claim 1, further comprising:
    determining text distances between each entity in the group of entities; and
    removing one or more entities when the text distance between a first entity and a second entity satisfies a deduplication threshold.

6. The method of claim 1, further comprising:
    identifying at least one entity alias for an entity in the group of entities;
    adding the at least one entity alias to an alias list; and
    deduplicating the at least one entity alias.

7. The method of claim 1, further comprising:
    executing a collaborative filter to create the organization embedding and the entity embeddings from the profile data; and
    determining an inner product of the organization embedding and an entity embedding to determine a likelihood that the organization and the entity interact.

8. The method of claim 1, further comprising generating an organization embedding based on transactional data absent data regarding use of one or more entities.

9. A system of entity predictive matching, comprising:
    at least one processor;
    at least one memory coupled to the at least one processor that stores instructions, that when executed by the at least one processor, cause the system to:
        receive a description of a transaction associated with a first an organization;
        invoke at least one machine learning model to infer:
            a transaction embedding based on the description;
            a first score that captures similarity between the transaction embedding and entity embeddings associated with a global list of entities and organizations, wherein the global list of entities is a deduplicated initial set of entities based on a density of a group of entities that satisfies a density threshold;
            a second score that captures a probability of interaction between the first organization and the entities based on an organization embedding and entity embeddings that capture profile data associated with the organization and the entities; and
            at least one candidate entity based on the first score and the second score; and
        return the at least one candidate entity.

10. The system of claim 9, wherein the instructions further cause the system to generate the global list of entities by deduplicating an initial set of entities based on one or more of spelling or letter case variations.

11. The system of claim 9, wherein the instructions further cause the system to generate the entity embeddings for a configurable number of entities in the global list of entities.

12. The system of claim 9, wherein the instructions further cause the system to segment the initial set of entities into one or more groups of entities based on the entity embeddings similarity between the entity embeddings.

13. The system of claim 9, wherein the instructions further cause the system to:
    compute text distances between each entity in the group of entities; and remove one or more entities when the text distance between a first entity and a second entity satisfies a deduplication threshold.

14. The system of claim 9, wherein the instructions further cause the system to:
    identify at least one entity alias for an entity in the group of entities;
    add the at least one entity alias to an alias list; and
    deduplicate the at least one entity alias.

15. The system of claim 9, wherein the instructions further cause the system to generate the organization embedding based on transactional data absent data regarding use of one or more entities.

16. The system of claim 9, wherein the instructions further cause the system to fill a field in a graphical user interface associated with the transaction with the candidate entity.

17. A method, comprising:
    receiving a description of a transaction associated with an organization;
    invoking at least one machine learning model to infer:
        a transaction embedding based on the description;
        a first score that captures similarity between the transaction embedding and each entity embedding in a global list of entities, wherein the global list of entities is generated by deduplicating an initial set of entities based on a density of a group of entities that satisfies a density threshold;
        a second score that captures a probability of interaction between the organization and the global list of entities based on an organization embedding and each entity embeddings in the global list of entities that capture profile data associated with the organization and the entities; and
        at least one candidate entity match from the global list of entities based on the first score and the second score; and
    filling a field in a graphical user interface associated with the transaction with the candidate entity match.

18. The method of claim 17, further comprising generating the organization embedding based on transactional data absent data regarding use of one or more entities.

19. The method of claim 17, further comprising:
    determining text distances between each entity in the group of entities; and
    removing one or more entities when the text distance between a first entity and a second entity satisfies a deduplication threshold.

20. The method of claim 17,
    identifying at least one entity alias for an entity in the group of entities;
    adding the at least one entity alias to an alias list; and
    deduplicating the at least one entity alias.

* * * * *